Patented Mar. 14, 1939

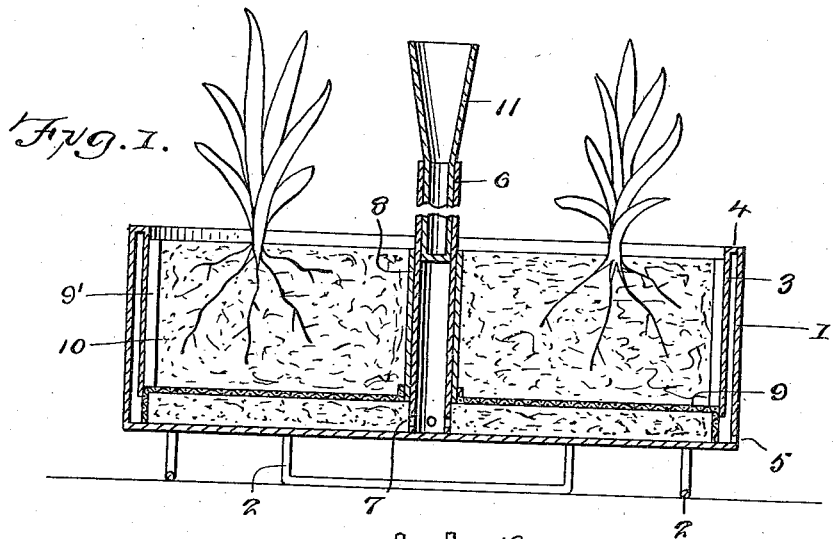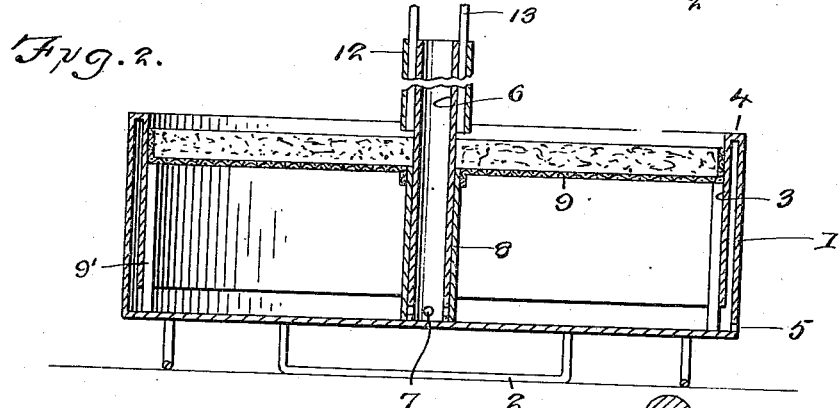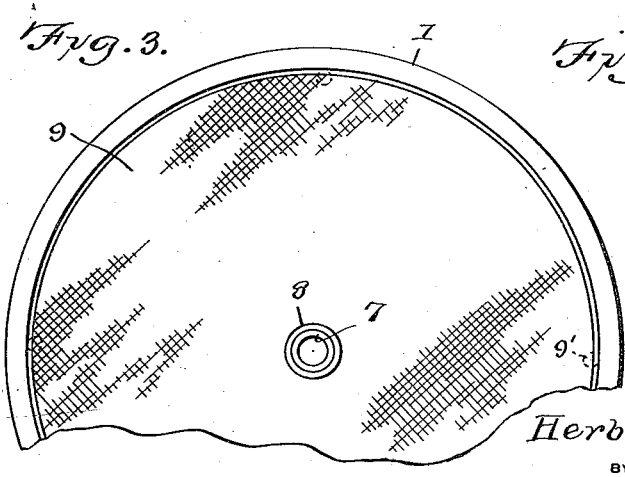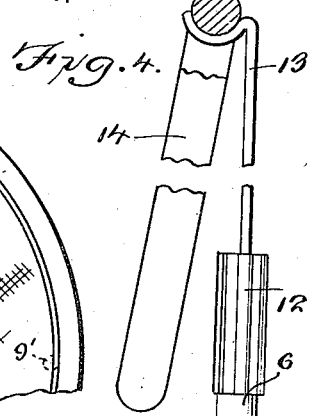
Herbert T. Lester INVENTOR

2,150,605

UNITED STATES PATENT OFFICE 2,150,605

FLOWER PAN

Herbert T. Lester, Marine City, Mich.

Application May 28, 1937, Serial No. 145,327

1 Claim. (Cl. 47—38)

This invention relates to flower pans especially adapted for cemeteries and has for the primary object the provision of an inexpensive portable device which may be rested upon the ground and in which plants, flowers and the like may be planted and also has means for supporting in water cut flowers and further may be employed for supporting wreaths and similar ornamental floral pieces.

Another object of the invention is the provision of means for furnishing moisture to the soil of the plants for assuring growth and which may be used for a decorative medium when desired.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a vertical sectional view illustrating a flower pan constructed in accordance with my invention.

Figure 2 is a view similar to Figure 1 showing a rearrangement of parts to permit the moistening substance to be employed as a decorative medium.

Figure 3 is a fragmentary top plan view illustrating the device.

Figure 4 is a fragmentary side elevation, partly in section, illustrating means for supporting a wreath or the like.

Figure 5 is a perspective view illustrating an attaching sleeve.

Referring in detail to the drawing, the numeral 1 indicates a receptacle open at its upper end and which may be of any selected shape. The receptacle is supported by legs 2 fastened on the bottom of the receptacle. The receptacle 1 has inner walls 3 spaced from the vertical walls of the receptacle and joined to the upper edges of the latter, as shown at 4. The inner walls 3 terminate a short distance above the bottom of the receptacle 1 and a drain opening 5 is located in the receptacle 1 slightly above the bottom wall.

A tube 6 is fastened on the bottom wall of the receptacle 1 and rises a distance above the vertical walls of the receptacle and is centrally located in the latter and is provided with ports 7 adjacent its lower end. A sleeve 8 has a sliding fit with the tube 6 and is secured onto a foraminous rack 9 for supporting said rack either in engagement with the bottom wall of the receptacle, as shown in Figure 1, or in a position adjacent to the upper edge of the receptacle, as shown in Figure 2. The rack also has supporting legs 9'. Arranged within the rack 9 is moss and to saturate the moss with water it is poured into the tube 6 from the upper end thereof and any surplus water may flow off by way of the drain opening 5. The rack when positioned as shown in Figure 1 forms a support for soil 10 in which plants are planted. The soil absorbs moisture from the moss and in turn furnishes the plants moisture to assure the growth thereof. If at any time it is not desired to have growing plants in the device such as in winter time, the rack 9 may be positioned, as shown in Figure 2, to expose the moss to view. The moss being green will provide to the device a more attractive appearance. Of course, it is to be understood that when the rack is positioned, as shown in Figure 2, the soil 10 and the plants are removed.

A substantially funnel-shaped container 11 may be positioned in the upper end of the tube for the purpose of containing water and supporting cut flowers and is easily removed from the tube 6 when desiring to supply the moss with water. Adaptable to the tube 6 in lieu of the container 11 is an attaching sleeve 12 having a series of corrugations. The sleeve 12 has a sliding fit with the tube 6 and a rack 13 may have ends thereof inserted in the corrugations, as shown in Figure 2. The rack 13 is for the purpose of supporting a wreath or similar floral piece generally indicated by the character 14.

What is claimed is:

A flower pan comprising a receptacle including a bottom and vertical walls integral with the bottom wall and one of said vertical walls having a drain opening adjacent the bottom wall, a tube rising vertically from the bottom wall and terminating in a plane above the upper edges of the vertical walls to receive water and to act as a holder for a floral display, said tube having openings adjacent the bottom wall, inner vertical walls integral with the upper edges of the first-named vertical walls and spaced therefrom and terminating in spaced relation to the bottom wall, a sleeve removably mounted on the tube and reversible on the latter, a foraminous moss supporting rack carried by the sleeve and including marginal flanges to contact with the second-named vertical walls and extend downwardly or upwardly in the receptacle by the reversing of the sleeve on the tube and to contact with the bottom wall and remain in engagement with the second-named vertical walls when the rack is in its lowermost position in the receptacle, and legs carried by the rack and having slidable fit with the second-named vertical walls and engageable with the bottom wall when the rack is in its uppermost position in the receptacle.

HERBERT T. LESTER.